UNITED STATES PATENT OFFICE 2,115,191

DRY APPLE BUTTER

Phares S. Brubaker, Sterling, Ohio

No Drawing. Application July 13, 1937,
Serial No. 153,407

3 Claims. (Cl. 99—101)

This invention relates to the class of food compounds and pertains particularly to an improved edible preparation prepared from apples.

The present invention has for its primary object to provide an improved stable food in dry form from apples.

Another object of the invention is to provide a dry form of apple butter produced by a novel method of processing separately apple pulp and apple juice or cider and mixing and again processing to produce the final dry product.

The process consists broadly in taking the juice of apples or cider which has been obtained from fully ripened apples of a spicy variety and concentrating the same by evaporation to approximately one-sixth of its original bulk or fluid consistency.

Apples of the same variety are then cooked in the proper quantity by the use of live steam which is discharged through the comminuted apples until the same have been thoroughly cooked. This cooking process is pref rably carried out in a wooden receptacle. After the apples have been reduced to a softened condition, they are thoroughly drained in any suitable manner to remove the excess moisture and are then ground or chopped up into a pulp, and this pulp is then forced through suitable copper screens to effect the removal of all seeds, peelings and hard particles.

The pulped apples and the concentrated juice are then mixed together and it is preferred that the mixing operation be continued for approximately thirty minutes until a thorough blending of the juice and pulp is obtained. After mixing the juice and pulp the mixture is dried in a suitable drying apparatus, on stainless steel trays, until a fairly solid mass is obtained, and this mass is then transferred to trays of copper screen wire and the drying process is continued. It is preferred that the mixed pulp and concentrated juice be subjected to the first drying step for a period of from six to eight hours, and in the second drying step for a period of from twenty-four to thirty-six hours, and that the surrounding air be maintained at a temperature of between 150° and 175° F.

During the drying steps the contents of the trays are constantly chopped and stirred so that the moisture will have evaporated from the interior of the mass relatively rapidly. These drying steps carried out for the period of time and at the temperature stated, will reduce the mixture to a relatively low water content.

The reduced mixture is then transferred to a suitable cooling or chilling apparatus such as a refrigerator or a cooling room, where it is subjected for a period of from two to three hours, to a temperature which will reduce the mass in this time to approximately its freeezing point. The cold mass is then thoroughly milled to reduce it to a medium-fine condition.

Following the milling step the mass is transferred to a drying frame and subjected for a period of from two to three hours to a temperature of from 140° to 175° F. after which it is again transferred to the cooling room where the air is maintained moisture free and the temperature is again reduced to approximately the freezing point for the mass. The mass is then again subjected to a milling or grinding operation and reduced to a fine powder.

Altho the product produced according to the foregoing steps will keep indefinitely, it is preferred to add approximately one one-hundredth percent of benzoate of soda in order to prevent the development of mold.

To illustrate more specifically one method of producing the dry apple butter, 120 gallons of cider is concentrated to approximately twenty gallons, and this proportion of concentrated apple juice or cider is mixed with one hundred gallons of apple pulp produced in the manner above described. This mixture is then subjected to the steps set forth to produce the final product.

The dried apple butter may be used in any manner which is found suitable, but it is preferred that it be prepared for table use by mixing in a suitable receptacle equal parts of the dry apple butter and sugar, adding sufficient boiling water to make a heavy paste, and then boiling the mixture for approximately five minutes while at the same time constantly stirring to prevent sticking. The product will be similar to apple butter prepared in the usual manner.

For persons who are unable to take sugar, the powder may be mixed with honey to form a butter-like mass.

What is claimed, is:

1. The process of producing a dried powdered apple butter, which consists in evaporating apple juice to a concentrated condition, preparing a pulp from whole apples, mixing the concentrated juice and pulp, evaporating moisture from the mixture until the same assumes a massed condition, subjecting the mass to substantially a freezing temperature, grinding the mass to reduce its fineness while it is in the cold condition, again heating to remove residual moisture, chilling to substantially freezing condition, and finally grinding to a fine powder while in the chilled condition.

2. The process for the production of a dried apple food, which consists in evaporating apple juice to a concentrated condition, preparing a cooked apple pulp, draining excess water from the pulp, mixing the concentrated juice and pulp together, subjecting the mixture to heat for a period totaling at least thirty hours to reduce the moisture content to a low percentage, then chilling the mixture to approximately its freezing point, grinding the mixture while in the chilled condition, then heating the ground mixture for at least two hours at a relatively high temperature, cooling the mass in a substantially moisture-free atmosphere to approximately its freezing point, and grinding the mixture to a fine powder while it is in the chilled condition.

3. The process of producing a dried powdered apple butter, which consists in evaporating apple juice to a concentrated condition, preparing a pulp from whole apples, mixing said juice and pulp, evaporating moisture from the mixture until the same assumes a massed condition, and finally subjecting the mass to successive steps of chilling to approximately its freezing point, grinding and then heating to obtain a powdered product.

PHARES S. BRUBAKER.